(12) United States Patent
Joseph

(10) Patent No.: US 8,347,686 B2
(45) Date of Patent: Jan. 8, 2013

(54) AUTOMATIC VALVE CALIBRATION OF A BLOWN-FILM EXTRUSION APPARATUS

(76) Inventor: Daniel R. Joseph, Grand Prairie, TX (US)

( * ) Notice: Subject to any disclaimer, the term of this patent is extended or adjusted under 35 U.S.C. 154(b) by 308 days.

(21) Appl. No.: 12/816,243

(22) Filed: Jun. 15, 2010

(65) Prior Publication Data

US 2011/0302990 A1    Dec. 15, 2011

(51) Int. Cl.
*G01L 27/00* (2006.01)
(52) U.S. Cl. ......................................................... 73/1.72
(58) Field of Classification Search ................... 73/1.72
See application file for complete search history.

(56) References Cited

U.S. PATENT DOCUMENTS

| | | | |
|---|---|---|---|
| 3,690,115 A | 9/1972 | Clayton | |
| 4,523,452 A * | 6/1985 | Brayman | 73/40 |
| 4,658,634 A | 4/1987 | Killough et al. | |
| 4,752,211 A | 6/1988 | Sabin | |
| 4,830,274 A | 5/1989 | Johnson et al. | |
| 5,104,593 A | 4/1992 | Joseph | |
| 5,352,393 A | 10/1994 | Joseph | |
| 5,525,277 A | 6/1996 | Joseph | |
| 5,616,822 A | 4/1997 | Griffiths et al. | |
| 5,711,507 A | 1/1998 | Berget et al. | |
| 5,762,475 A * | 6/1998 | Maddock et al. | 417/29 |
| 5,891,383 A | 4/1999 | Joseph | |
| 6,293,778 B1 | 9/2001 | Joseph | |
| 6,397,655 B1 | 6/2002 | Stephenson | |
| 6,423,261 B1 | 7/2002 | Joseph et al. | |
| 6,438,501 B1 | 8/2002 | Szecsody et al. | |
| 6,562,263 B2 | 5/2003 | Cree | |
| 6,571,190 B2 | 5/2003 | Hou et al. | |
| 6,591,201 B1 * | 7/2003 | Hyde | 702/45 |
| 6,592,786 B2 | 7/2003 | Joseph | |
| 6,615,114 B1 | 9/2003 | Skiba et al. | |
| 6,922,608 B2 | 7/2005 | Joseph | |
| 6,934,643 B2 | 8/2005 | Kar et al. | |
| 7,093,639 B2 | 8/2006 | Buttel et al. | |
| 7,512,460 B2 | 3/2009 | Strosser et al. | |
| 7,562,554 B2 | 7/2009 | Yoo et al. | |
| 2001/0037670 A1 * | 11/2001 | Boger et al. | 73/1.72 |
| 2002/0076459 A1 | 6/2002 | Joseph | |
| 2002/0158360 A1 | 10/2002 | Joseph | |
| 2007/0187856 A1 | 8/2007 | Kitauji et al. | |
| 2008/0161976 A1 | 7/2008 | Stanimirovic | |
| 2009/0223358 A1 | 9/2009 | Green | |

OTHER PUBLICATIONS

Viswanathan, M. et al., "Design and devolopment of thermal mass flowmeters for high pressure applications," Flow Measurement and Instrumentation 13, May 17, 2002, pp. 95-102, Elsevier Science Ltd.

* cited by examiner

*Primary Examiner* — Hezron E Williams
*Assistant Examiner* — Nashmiya Fayyaz
(74) *Attorney, Agent, or Firm* — Paul D. Lein; Mark D. Perdue

(57) ABSTRACT

The present invention relates to a method of automatically calibrating a valve in a fluid flow path of a blown-film extrusion apparatus. The calibration process detects and measures a first and second pressure drop in the flow characteristic, as well as the valve position and time. The process further detects time required to achieve a steady-state in the flow characteristics. These measurements are recorded and used in calculating appropriate valve positions.

20 Claims, 4 Drawing Sheets

AUTOMATIC VALVE CALIBRATION OF A BLOWN-FILM EXTRUSION APPARATUS

TECHNICAL FIELD OF THE INVENTION

The present invention relates generally to a method for the calibration of valves for use in control of complex fluid systems. Specifically, the present invention relates to calibration of a valve employed between the blower and die in a blown-film extrusion apparatus.

BACKGROUND OF THE INVENTION

Fluid valves frequently are employed to control various aspects of fluid systems. Such valves often are automatically controlled. Due to the empirical nature of fluid dynamics, the flow through the valve, and the valve's effect on the system, may be unpredictable and difficult to model. As a result, these valves frequently must be calibrated after installation in the fluid system so that any control apparatus or routine can take into account the valve's actual performance and behavior in the system. Such calibration routines typically are "manual," meaning the valve must be adjusted "by hand" and various flow measurements obtained under varying conditions to calibrate the control system for the valve.

One such fluid system that poses the valve calibration problem is the blown-film extrusion apparatus, which is used to manufacture various polymeric films used in a wide variety of products and industries. Such apparatuses typically use a column of pressurized air to inflate an extruded thin film of polymer into a large-diameter tube with a very thin wall. This tube is stretched and expanded by the action of overhead nip rollers and internal air pressure. Exemplary blown-film lines are shown in U.S. Pat. Nos. 5,891,383 and U.S. Pat. No. 6,293,778 to Joseph, which are incorporated herein by reference.

Control of the air column is accomplished by a valve downstream of an air blower. Blown-film dies, as a group, represent a wide range of pressure loads downstream of the valve, and the column of air must be carefully controlled to ensure uniformity in blown-film production. An upstream load on the flow producing device also changes with time as the system operates. This is because of changes in backpressure across filtering devices that clean the fluid. The downstream load may be changed or varied due to user intervention or other circumstances beyond the users' control. Because of the complexities of compressible air and the blown-film die pressure load, the valves employed in these systems must be manually calibrated as described above.

Further adding to this complexity is the use of valves that do not have repeatable positioning characteristics. Such valves require multiple calibrations when new, as well as additional calibrations at certain time intervals thereafter to accommodate "break-in" of the valve. This calibration occurs at minimum when the system is set up or if the valve is replaced. It may also be necessary if parameters or components of the system other than the valve change. Ideally, the valve is recalibrated when these changes occur, but this is often not the case. As a result, suboptimal performance from the valve occurs and production rate and accuracy suffer. Additionally, manual calibration is a time-consuming and expensive process requiring trained personnel.

Thus, a need exists for a method of calibration of valves in complex fluid systems, such as a blown-film extrusion apparatus, that is accurate, repeatable and capable of being implemented in an automated fashion, e.g., by use of a computer.

Further, a need exists for a method to include means for activating the calibration process depending on a variety of conditions that it monitors.

SUMMARY OF THE INVENTION

It is therefore a general object of the present invention to provide an improved method of calibrating a fluid valve in a complex fluid system. It is another object of the present invention to provide a method of automatically calibrating a fluid valve in a complex fluid system. These objectives are achieved as is now described.

A method for calibrating a valve between a blower and a pressure load according to an embodiment of the present invention comprises the steps of measuring and recording an idle flow characteristic downstream of the valve with the blower in an idle state and the valve in a substantially open position. The blower is then accelerated to a selected speed by a computer, and a steady-state, valve-open flow characteristic is measured downstream of the blower. Next, the valve is closed at a selected rate of closure. When a first predetermined change is detected in the flow characteristic downstream of the valve, this first flow characteristic is recorded along with the current valve position and time. During this time, the valve continues to close at the selected rate of closure. When a second predetermined change is detected in the flow characteristic downstream of the valve, this second predetermined change is also recorded along with the current valve position and time.

At this point, the valve closure operation is stopped. When a steady-state flow characteristic downstream of the valve is detected, the amount of time that has elapsed from when the valve closure was stopped to when the steady-state flow characteristic is detected is recorded. Next, the valve closure operation is resumed. When another steady-state flow characteristic downstream of the valve is detected, the amount of time that has elapsed from when the valve closure was resumed to when the steady-state flow characteristic is detected is recorded. Once the aforementioned measurements are recorded, the system then calculates and stores valve position data based on the first and second recorded flow characteristics, valve position and time lag. This completes the calibration process.

In one embodiment of the present invention, the flow characteristic that is measured and recorded is static pressure. In this embodiment, the system measures and records static pressure with a static pressure transducer.

In another embodiment of the present invention, the flow characteristic data is graded, rounded and stored after calibrating the valve.

In still another embodiment of the present invention, additional flow characteristics, valve positions and times may be recorded in order to more accurately calibrate the valve.

In yet another embodiment of the present invention, the steady-state speed of the blower as used during the calibration process is selected according to the flow characteristic provided by the blower.

In still another preferred embodiment of the present invention, the valve is placed in a fluid flow path of a blown-film extrusion apparatus downstream of a blower and upstream of the pressure load. In this preferred embodiment, the pressure load is at least one blown-film die. The valve in this preferred embodiment comprises a pressure-actuated bladder valve, and valve position data is supplied to the valve as pressure.

One of the principal advantages of the exemplary embodiments is that it provides a relatively inexpensive and accurate method for calibrating a bladder valve. Conventional bladder valves are well known in the blown-film market. They provide a wide linear range of operation, low pressure drop, and do not induce an air flow disturbance into the air stream, which is a distinct advantage for sensitive processes like blown-film extrusion. Compared to other valves with repeatable positioning characteristics, bladder valves are known to require several "break-in" calibrations upon initial setup, and further calibrations thereafter. Additionally, recalibrations of the bladder valve should occur when the blown-film pressure load is changed or varied. However, in many instances, this not possible or impracticable. As a result, suboptimal performance from the valve occurs and production accuracy and efficiency suffers. This attribute of bladder valves is negated by the automated nature afforded by the present invention.

Another principal advantage of the exemplary embodiments is that inexpensive static pressure transducers may be used in place of normally more cost prohibitive flow sensors. Traditionally, flow sensors such as mass air flow sensors, venturi tubes, and pitot tubes have been employed to measure and record the feedback of flow characteristics of a fluid. However, these flow sensors typically cost several times the amount of a static pressure transducer. Further, these flow devices are sensitive to physical positioning within the fluid flow path and as such often require flow straighteners at additional cost. Another flow sensing method using a converging/diverging nozzle in combination with a differential static pressure transducer is also plausible, but the added cost of duct diameter dependent nozzles and the empirical testing to determine the flow relationship with the measured differential static pressure also makes this implementation cost prohibitive when considered across a wide range of installations. Thus, an exemplary embodiment of the present invention utilizes a static pressure transducer to measure and record static pressure rather than flow rate. The present invention is able to process measurements in the form of static pressure in lieu of flow rate and calibrate the valve accordingly.

Naturally, the invention will allow significant savings in the labor and time required to calibrate the valve, along with additional savings by allowing for less expensive sensors to be used in the blown-film extrusion operation.

As referred to hereinabove and throughout, the "present invention" refers to one or more exemplary embodiments of the present invention, which may or may not be claimed, and such references are not intended to limit the language of the claims, or to be used to construe the claims in a limiting manner.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. As used herein, "substantially" is to be construed as a term of approximation.

Figure 1:
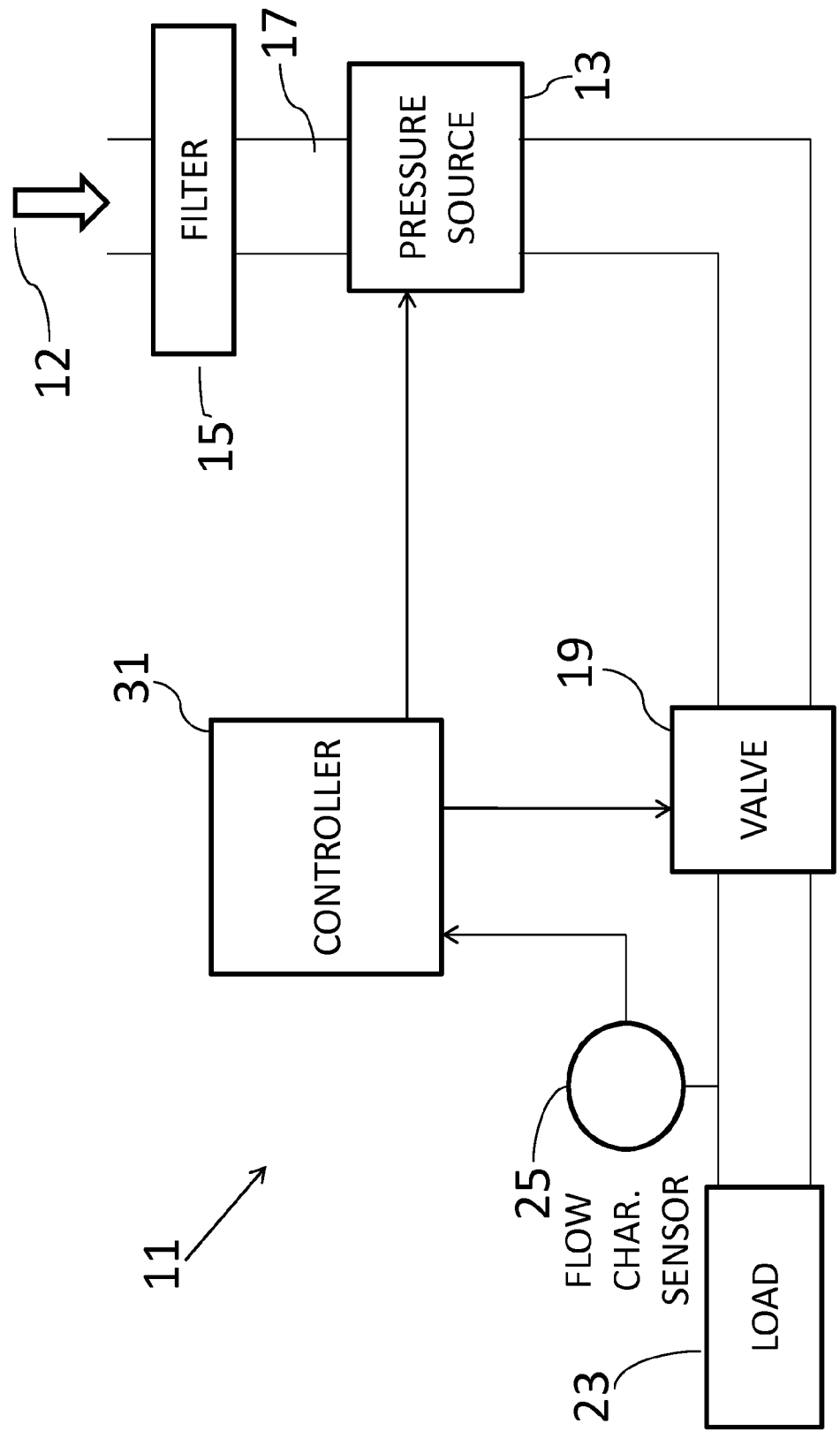
FIG. 1 is a block diagram depicting the functional layout of the system components.

FIG. 1 shows a block diagram of a generic fluid system 11 of the type in which the calibration method of the present invention is used. Fluid system 11 may comprise a pressure load 23 which performs some useful action as a result of the proper amount of fluid flow as managed or controlled by a pressure source 13 and a valve 19. A filter 15 protects the pressure source 13, valve 19, and pressure load 23 from environmental contaminants that could damage or adversely affect the performance of pressure load 23. A fluid duct or pipe 17 connects filter 15, pressure source 13, valve 19, and pressure load 23. Fluid pipe 17 is generally leak free. The distances between pressure source 13, valve 19, and pressure load 23, as well as the diameter of pipe 17 may vary depending on the individual characteristics of each element. Pressure source 13 is selected such that sufficient pressure and flow capacity is generated to pressure load 23; taking into account flow losses developed by filter 15, fluid pipe 17 and valve 19. Other loads in fluid pipe 17 may also be present and the selection of pressure source 13 would also account for those additional flow losses. Valve 19 controls fluid flow supplied to pressure load 23 and, for control purposes, may be calibrated to take into account variables present in fluid system 11, including pressure source 13, fluid pipe 17, valve 19, and pressure load 23. As described in greater detail in connection with FIGS. 2-3, sensor 25 is used to measure flow characteristics of the fluid downstream of valve 19 given certain blower outputs and valve positions.

A controller 31 such as a personal computer, a programmable logic controller, or a remote terminal unit is communicably connected to pressure source 13, valve 19, and a flow characteristic sensor 25. Controller 31 is able to set the operational speed of pressure source 13. Pressure source 13 generates a static pressure which in turn produces a velocity pressure utilized by pressure load 23 to produce the required action. During normal operations, flow characteristic sensor 25 is optionally used as an input to controller 31. Additionally, some characteristic of the performance of pressure load 23 may optionally be used to determine whether valve 19 may require a recalibration, or whether to alert a warning that the efficiency of pressure source 13 has dropped below an established level. In operation, controller 31 calibrates valve 19 by determining a linear operating range, for example by calculating a linear operating range which includes start, mid, and end points for use in control of valve 19 during operation of fluid system 11.

Figure 2:
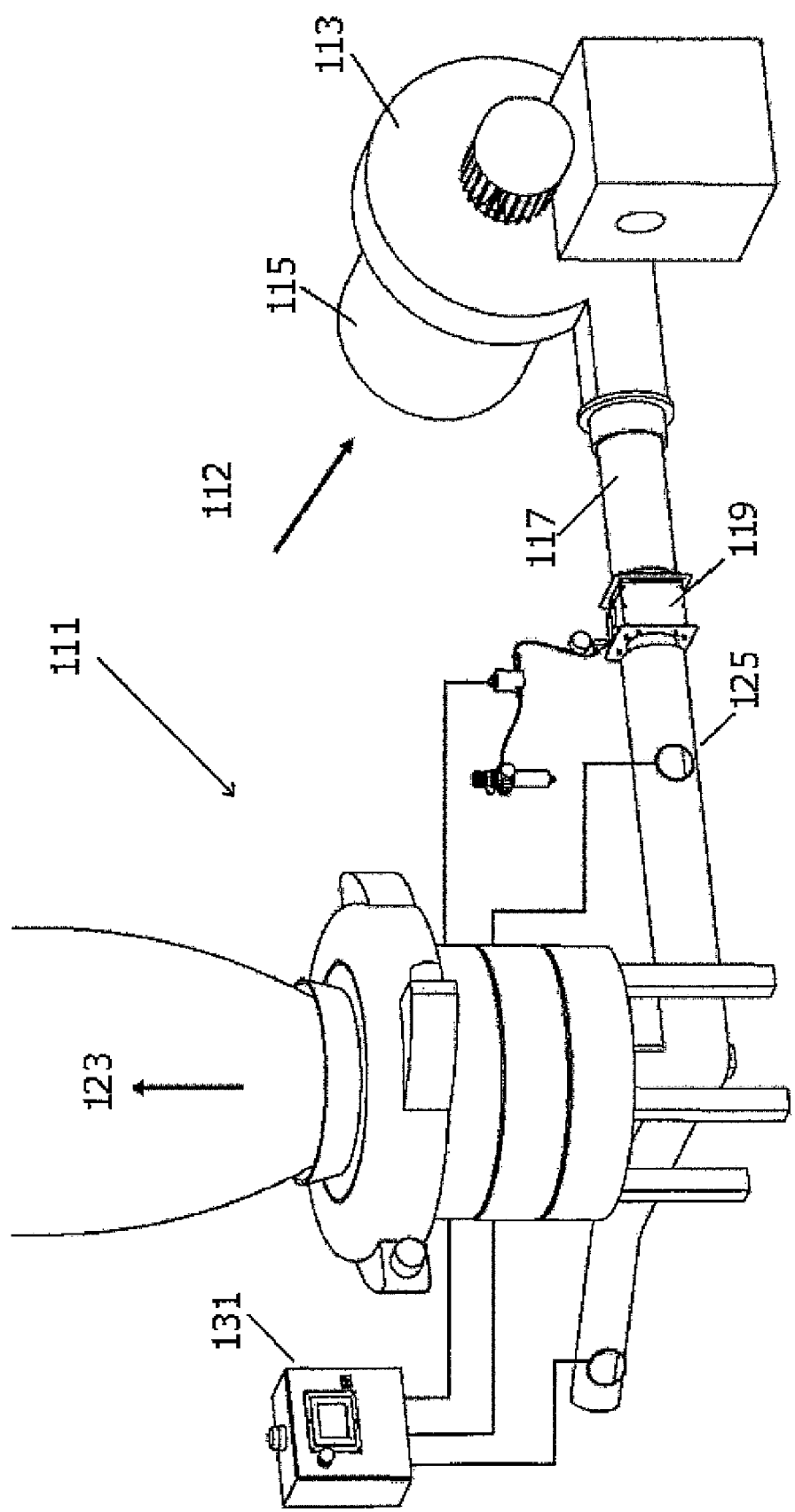
FIG. 2 is a view of a blown-film extrusion apparatus equipped with a blower, a valve downstream of the blower, and sensors for measuring the flow characteristics of a fluid that flows through the extrusion line and valve.

Referring to FIG. 2, a blown-film extrusion line 111 is shown. This is a specific fluid system in which the preferred and illustrated embodiment of the method of the present invention will be described. Blown-film extrusion line 111 is analogous to the system shown in FIG. 1, with similarly numbered components functioning similarly. The line 11, 111 may comprise a pressure load 23, 123 in the form of a blown-film die. A fluid 12, 112 may be fed to pressure load 23, 123 by means of a fluid pressure source or blower 13, 113 attached to the end of a conduct or pipe 17, 117. A filter 15, 115 may be attached to pipe 17, 117 upstream of blower 13, 113. A valve 19, 119 may be attached downstream of blower 13, 113, and upstream of pressure load 23, 123. The distances between blower 13, 113, valve 19, 119, and pressure load 23, 123 may vary depending on the individual characteristics of each element. Therefore, blower 13, 113 may preferably be selected to generate sufficient pressure to force air through the passageways of pipe 17, 117 and pressure load 23, 123. The selection of blower 13, 113 may also take into account the calculated flow losses within the fluid flow path. Thus, blower 13, 113 preferably produces sufficient pressure to overcome velocity pressure requirements, frictional losses and parasitic leak losses.

Valve 19, 119 may support several valve positions, which allow varying amounts of fluid 12, 112 to pass through pipe 17, 117 at varying flow rates. While butterfly and rotary valves are known in the art, valve 19, 119 is preferably a pressure-actuated bladder valve, as described in U.S. Pat. No. 5,352,393 to Joseph, which is incorporated herein by reference. Bladder valves generally exhibit superior performance with regards to several properties such as linear range, flow capacity, effect of flow rate on valve position, resistance to dirt buildup, valve position accuracy with dirt buildup, overall layflat performance, and size of the valve. Additionally, the size of valve 19, 119 may be selected according to calculations based upon dimensional data from the physical fluid flow path within pressure load 23, 123. Other factors which may affect the selection of valve 19, 119 include the size and shape of pipe 17, 117 as well as the performance characteristics of blower 13, 113. The bladder valve 19, 119 is operated by application of pneumatic pressure, and its position varies as a function of the pressure supplied to the valve. Other valves may be mechanically, electrically or electromechanically actuated.

In a preferred embodiment of the present invention, valve 19, 119 may be housed in a blown-film extrusion apparatus. In a preferred embodiment, valve 19, 119 may be located between blower 13, 113, and pressure load 23, 123. Pressure load 23, 123 may be at least one blown-film die. Other embodiments of the present invention may contemplate a pressure load of multiple blown-film dies. Additionally, other embodiments of the present invention may utilize alternatives for valve 19, 119, for example a bladder valve, and valve position data may be supplied to valve 19, 119 in the form of direct pressure. Finally, other embodiments of the present invention may utilize multiple valves configured in parallel configurations as shown in U.S. Pat. No. 5,352,393. In order to take these various factors into account, and additional considerations such as a plurality of blown-film dies and fluid flow paths, valve 19, 119 may preferably be selected at the time when blown-film extrusion line 11, 111 is ordered.

A sensor 25, 125 for measuring flow characteristics of the fluid may be located downstream of blower 13, 113 and valve 19, 119. Sensor 25, 125 may be located far enough downstream of valve 19, 119 so as to accurately measure downstream flow characteristics isolated from flow characteristics upstream of valve 19, 119. The actual distance that sensor 25, 125 may be placed from valve 19, 119 may vary depending on various alternative embodiments chosen for valve 19, 119 and sensor 25, 125. For example, in one embodiment of the present invention, sensor 25, 125 may be an integrated portion of valve 19, 119.

In a preferred embodiment of the present invention, the particular flow characteristic of fluid 12, 112 that is measured and recorded is static pressure. In such a preferred embodiment, sensor 25, 125 is a static pressure transducer that measures static pressure as a flow characteristic (static pressure is proportional to the square of volume flow rate, which is the real flow characteristic of interest). The advantage of this embodiment is the low cost afforded by using a static pressure transducer in place of a flow sensor. Alternatively, sensor 25, 125 may be a mass airflow sensor or some other conventional flow characteristic sensor, such as a converging/diverging nozzle with a differential pressure transducer.

A controller or computer 31, 131 such as a personal computer, a programmable logic controller, or a remote terminal unit may be communicably connected to valve 19, 119 and sensor 25, 125. Computer 31, 131 may be a personal computer, a programmable logic controller, or a remote terminal unit, and may be selected depending on one or more factors, such as the environment in which computer 31, 131 is placed, calibration speed, and other requirements of the present invention. Computer 31, 131 may contain various user interface controls such as a display screen and keypad to facilitate interaction with a technician or operator. Computer 31, 131 may send and receive information from valve 19, 119 and sensor 25, 125. Computer 31, 131 may also store or record information received from valve 19, 119 and sensor 25, 125, and may process this information in accordance with one or more embodiments of the present invention.

Figure 3A:
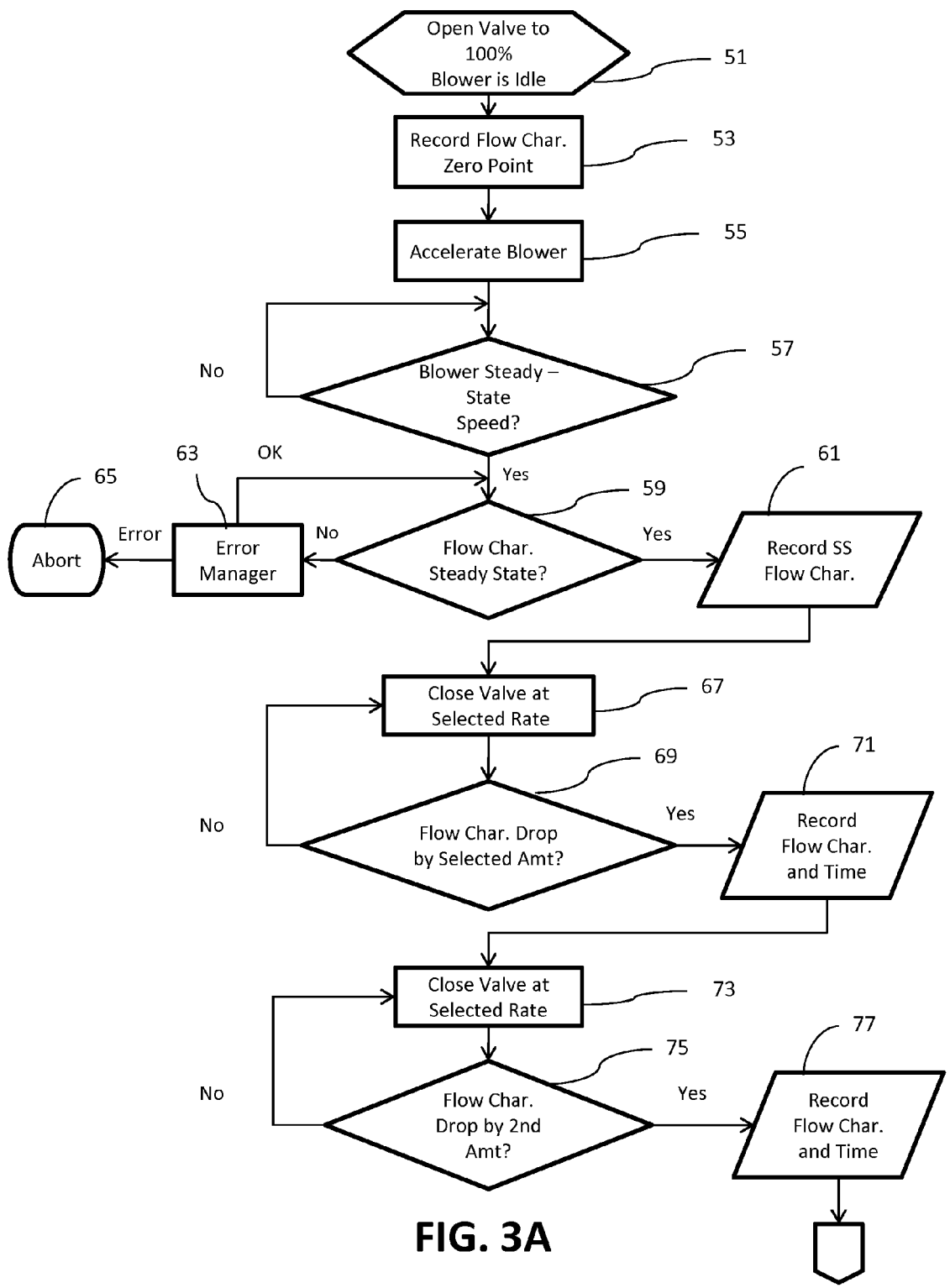
FIG. 3A is a flow chart illustrating a preferred process of automatically calibrating a valve in a blown-film extrusion apparatus.

FIG. 3A is a flow chart of a preferred embodiment of the present invention. In step 51, valve 19, 119 may be set to "fully open" to allow maximum throughput of fluid 12, 112, while blower 13, 113 is in an idle state. Sensor 25, 125 may detect a zero or idle flow characteristic at this time. This zero of idle flow characteristic (static pressure) is recorded as a zero value by computer 31, 131 in step 53. Next, in step 55, blower 13, 113 is accelerated by ramping it up to a known speed or flow rate value. The known value may be 40 to 70 percent of the maximum speed of the output of blower 13, 113, and the known value may preferably be selected dependent on the static pressure characteristic of blower 13, 113. In a preferred embodiment of the present invention, if valve 19, 119 is brand new, computer 31, 131 selects a known value that is 70 percent of the maximum speed of blower 13, 113 regardless of the size of valve 19, 119. This is done to ensure that a good response on valve 19, 119 is recorded.

In step 57, computer 31, 131 may determine whether blower 13, 113 has reached a steady-state speed or output. If blower 13, 113 has reached a steady-state speed, computer 31, 131 may next determine whether the flow characteristic (static pressure) of fluid 12, 112 has reached a steady-state by reading values from sensor 25, 125 at step 59. If fluid 12, 112 is in a steady-state, computer 31, 131 may record the steady-state flow characteristic of fluid 12, 112 at step 61. However, if for some reason the flow characteristic of fluid 12, 112 has not reached a steady-state, an error message may be generated and forwarded to an error manager at step 63. The error manager may either determine to continue checking the fluid flow characteristic at 59, or if the error is unrecoverable, may decide to abort the calibration process at 65. This abortion will allow human intervention to determine the root cause of the problem and an opportunity to resolve the situation. In a preferred embodiment of the present invention, the error manager is a component or a subroutine in computer 31, 131.

After recording a steady-state fluid flow characteristic (static pressure) at step 61, computer 31, 131 may then instruct valve 19, 119 to begin closing at a selected rate of closure at step 67. At step 69, computer 31, 131 may determine whether the flow characteristic (static pressure) of fluid 12, 112 has dropped by a specific predetermined amount, which indicates that valve 19, 119 is beginning to have an effect on the flow characteristic of fluid 12, 112. If computer 31, 131 determines that the flow characteristic of fluid 12, 112 has dropped by a first predetermined amount, computer 31, 131 may record the flow characteristic at step 71. Computer 31, 131 may also record a first position for valve 19, 119, as well as the current time of the measurement. This data point may be used later in a calculation to locate a linear-range starting point for valve 19, 119. If computer 31, 131 determines that the flow characteristic of fluid 12, 112 has not dropped by a first predetermined amount, closing of valve 19, 119 may continue at step 67, and the process at step 69 may be repeated.

After computer 31, 131 records a flow characteristic at step 71, valve 19, 119 may continue closing at a selected rate at step 73. At step 75, computer 31, 131 may determine whether the flow characteristic (static pressure) of fluid 12, 112 has dropped by a second predetermined amount (again indicating that valve 19, 119 is affecting the flow characteristic). If computer 31, 131 determines that the flow characteristic of fluid 12, 112 has dropped by the second predetermined amount, computer 31, 131 may record the flow characteristic at step 77. Computer 31, 131 may also record a second position for valve 19, 119, as well as the current time of the measurement. This recorded flow characteristic may be used later in a calculation to locate the midpoint of the valve linear operating range. If computer 31, 131 determines that the flow characteristic of fluid 12, 112 has not dropped by the second predetermined amount, closing of valve 19, 119 at the selected rate may continue at step 73, and the process at step 75 may be repeated.

Figure 3B:
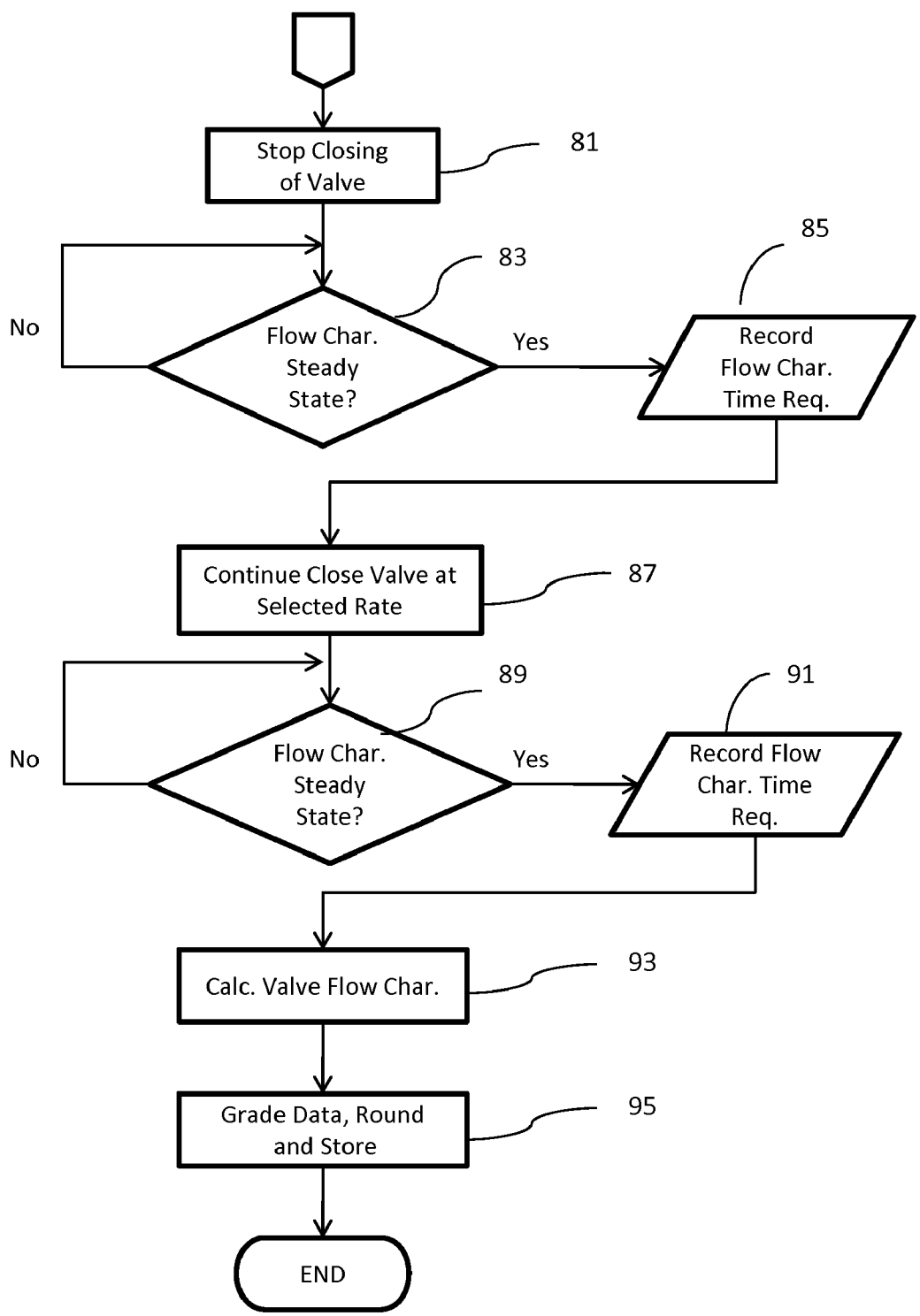
FIG. 3B is a continuation of the flow chart illustrating the preferred process of automatically calibrating a valve in a blown-film extrusion apparatus.

Continuing to FIG. 3B, after computer 31, 131 has recorded two separate changes in the flow characteristic of fluid 12, 112, valve positions of valve 19, 119, and time of the measurement, computer 31, 131 may stop the closing of valve 19, 119 at step 81. Computer 31, 131 may next determine whether a steady-state for the flow characteristic (static pressure) of fluid 12, 112 has been achieved at step 83. Computer 31, 131 may determine whether a steady-state is obtained by monitoring feedback from sensor 25, 125. If computer 31, 131 determines that the flow characteristic of fluid 12, 112 has not achieved a steady-state, then step 83 may be repeated. Once computer 31, 131 determines that the flow characteristic of fluid 12, 112 is in a steady-state, then at step 85, computer 31, 131 may record a lag1, which may be understood as a first amount of time elapsed between when the closing of valve 19, 119 was stopped and when the flow characteristic of fluid 12, 112 achieved a steady-state.

After recording lag1 at step 85, computer 31, 131 may continue closing valve 19, 119 at a selected rate at step 87. Thereafter, at step 89, computer 31, 131 may again monitor sensor 25, 125 for feedback to determine whether the flow characteristic (static pressure) of fluid 12, 112 has achieved another steady-state. If the flow characteristic of fluid 12, 112 has not achieved a steady-state, step 89 may be repeated until a steady-state is achieved. Once computer 31, 131 detects that the flow characteristic of fluid 12, 112 has achieved a steady-state, computer 31, 131 may record a lag2 at step 91, which may be understood as a second amount of time elapsed between when the closing of valve 19, 119 was stopped and when the flow characteristic of fluid 12, 112 achieved a steady-state. Furthermore, computer 31, 131 records the flow characteristic of fluid 12, 112 at this point.

After completion of the measurement phase, computer 31, 131 may utilize the recorded data to calculate a starting point and a mid-point of the linear operating range of valve 19, 119 at step 93. The starting point of valve 19, 119 may be calculated according to the relation:

$$Pidp - \left[Prr * \left(\frac{Lag1 + Lag2}{2}\right)\right]$$

Wherein Pidp is the valve position at the starting point recorded at step 71 (pressure applied to the valve for the bladder valve), Prr is the rate of valve closure, Lag1 is the time recorded at step 85, and Lag2 is the time recorded at step 91.

The mid-point point of the linear operating range of valve 19, 119 may be calculated according to the relation:

$$Pmdp - \left[Prr * \left(\frac{Lag1 + Lag2}{2}\right)\right]$$

Wherein Pmdp is the valve position at the mid-point recorded at step 77 (pressure applied to the valve for the bladder valve), Prr is the rate of valve closure, Lag1 is the time recorded at step 85, and Lag2 is the time recorded at step 91.

The flow characteristic (static pressure) calculations performed by computer 31, 131 may be graded, rounded and stored at step 95. The data points above may be sent to a grading process which may comprise a set of rules to ensure the validity of the measured results. One rule of the grading process may allow a user to infer a problem with the placement of sensor 25, 125. For example, sensor 25, 125 may be improperly located upstream of valve 19, 119 rather than preferably downstream of valve 19, 119. The upstream placement of sensor 25, 125 may result in little or no pressure drop during the process described in FIGS. 3A and 3B. The grading process may further include comparing the starting point value against a body of data that represents acceptable values for a particular valve size. If the starting point value is greater than the maximum acceptable value for a particular valve size, this may indicate a potential clog in pipe 17, 117 downstream of valve 19, 119, or that the selected valve 19, 119 is too large for the particular system.

In a preferred embodiment of the present invention, computer 31, 131 calibrates valve 19, 119 by determining its linear operating range, for example calculating the valve linear range starting point, mid-point and end-point. The end-point of the linear operating range may be readily inferred without too much in terms of specific calculations. There are several ways this may be done, with any one of them equally acceptable: 1) adding a known offset from the mid-point value that is also modified by the highest known allowable value; 2) extrapolating the end-point value from the start and mid points; or 3) using the pressure output located at some point where the static pressure (flow characteristic) drops to the zero point found in step 53.

In an embodiment of the present invention, computer 31, 131 may have calculation and storage means for recording all pertinent details of the last ten passes through the valve calibration process. This data may be organized with time and date stamps to facilitate review of past calibrations in the event that troubleshooting is required. The data recorded on computer 31, 131 may also be used to generate a baseline that may be used as an additional rule in the grading process. By way of example, if a result is outside of the baseline of past results by a statistically significant amount, the results may be flagged or otherwise noted for review by a technician. The technician may review the results for purposes of troubleshooting the calibration process. The results may also be used as an output to a quality control process that detects degradation in the load performance capability based on the data collected from the calibration process or for any other appropriate purpose.

One embodiment of the present invention may allow manual initiation and observation of the calibration process by a technician. This manual mode may have an error reporting tool which may assist a technician in properly identifying and diagnosing a specific problem. In this manual mode, the automatic calibration process may continue as normal, however, if the calibration process fails, the operator interface may exhibit a notification or warning of the particular failure. This notification may give pertinent information required for a technician to investigate further. If such an error occurs, blown-film extrusion line 11, 111 may still be run normally, if previous valve calibration parameters have been retained.

While the calibration method of the present invention is described in connection with a valve in a blown-film extrusion line, the method and its teachings are equally applicable in similarly complex fluid systems using compressible or uncompressible fluids, various valve configurations, various pressure sources, and/or variable pressure loads, such as blown-film die(s).

Other embodiments of the present invention may also measure and record additional flow characteristics, as well as positions of valve 19, 119, and times when the measurements were taken. Additional measurements may aid in calculating more accurate calibrations, but at the cost of additional time required for measuring and calculating the additional data points. Furthermore, an embodiment of the present invention may measure and record a single flow characteristic, valve position and time in order to decrease the overall amount of time required to perform the calibration. However, in this embodiment, calibration accuracy will decrease.

Further embodiments of the present invention may provide for factors used in determining when the automatic calibration process may occur. Factors maybe include, but are not limited to: 1) age of valve 19, 119 relative to when it was brand new; 2) amount of time that has elapsed since the last calibration process was run; 3) the number of startups of blown-film extrusion line 11, 111 since the last calibration process was run; and 4) the amount of time blown-film extrusion line 11, 111 has been powered off before being powered back on. These factors may individually or in combination determine when the automatic calibration process may occur. Additional factors may be added independently or in combination with the above mentioned factors, and are not exhaustive. Furthermore, computer 31, 131 may offer the ability to turn off automatic determination of calibration altogether.

While the automatic calibration process of the present invention may be preferred over manual calibration of valve 19, 119, various embodiments of the present invention may include a manual mode of calibrating valve 19, 119 in order to allow people familiar with valve calibration to continue with their normal operating procedures. It is envisioned that the present invention may support manual and automatic calibration modes without being mutually exclusive.

It will be readily apparent to those skilled in the art that the general principles defined herein may be applied to other embodiments and applications without departing from the spirit and scope of the present invention.

Having thus described the exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is contemplated that the appended claims will cover any such modifications or embodiments that fall within the true scope of the invention.

The invention claimed is:

1. A method of calibrating a valve used between a blower and a pressure load, the method comprising the steps of:
    measuring and recording an idle flow characteristic downstream of the blower with the blower in an idle state and the valve in an open position;
    accelerating the blower to a selected speed;
    measuring and recording a steady-state, valve-open flow characteristic downstream of the blower and valve;
    closing the valve at a selected rate of closure;
    detecting a first change in flow characteristic of a first predetermined amount from the valve-open flow characteristic downstream of the blower and valve as the valve closes and recording a first flow characteristic, valve position and time;
    detecting a second change in flow characteristic of a second predetermined amount from the valve-open flow characteristic downstream of the blower and valve as the valve closes and recording a second flow characteristic, valve position and time;
    stopping closure of the valve;
    measuring and recording the time required to achieve a second steady-state flow characteristic downstream of the blower and valve while the valve is stopped;
    resuming closure of the valve at the selected rate;
    measuring and recording the time required to achieve a third steady-state flow characteristic; and
    calculating and storing valve position data based on values selected from the recorded flow characteristics, recorded valve positions, rate of valve closure, and recorded times.

2. The method of claim 1, wherein each flow characteristic is static pressure.

3. The method of claim 1, wherein one of the calculated and stored valve position data is an initial valve position that is calculated according to the formula:

$$Pidp - \left[ Prr * \left( \frac{Lag1 + Lag2}{2} \right) \right]$$

where Pidp is the first valve position, Prr is the selected rate of valve closure, and Lag1 and Lag2 correspond respectively to the first and second times required to achieve the second and third steady-state flow characteristics.

4. The method of claim 1, wherein one of the calculated and stored valve position data is a mid-point valve position that is calculated according to the formula:

$$Pmdp - \left[Prr * \left(\frac{Lag1 + Lag2}{2}\right)\right]$$

where Pmdp is the second valve position, Prr is the selected rate of valve closure and Lag1 and Lag2 correspond respectively to the first and second times required to achieve the second and third steady-state flow characteristics.

5. The method of claim 1, further comprising the steps of rounding each measured flow characteristic, and storing each rounded flow characteristic.

6. The method of claim 1, further comprising the step of recording additional flow characteristics, valve positions and times.

7. The method of claim 1, wherein the steady-state selected speed of the blower is selected according to the valve size.

8. The method of claim 1, wherein the valve is housed in a blown-film extrusion apparatus between the blower and the pressure load, and the pressure load is at least one blown-film die.

9. The method of claim 8, wherein the valve comprises a pressure-operated bladder valve, and the valve position data is pressure applied to the valve.

10. A method of calibrating a valve disposed between a fluid pressure source and a pressure load, the method comprising the steps of:
measuring and recording an idle flow rate downstream of the fluid pressure source and valve with the fluid pressure source in an idle state and the valve in an open position;
increasing the pressure from the fluid pressure source to a selected amount;
measuring a steady-state, valve-open flow rate downstream of the fluid pressure source;
closing the valve at a selected rate of closure;
detecting a first change in flow rate of a first predetermined amount of the valve-open flow rate downstream of the fluid pressure source and valve as the valve closes and recording a first flow rate, valve position and time;
detecting a second change in flow rate of a second predetermined amount of the valve-open flow rate downstream of the fluid pressure source and valve as the valve closes and recording a second flow rate, valve position and time;
stopping closure of the valve;
measuring and recording the time required to achieve a second steady-state flow rate downstream of the fluid pressure source and valve while the valve is stopped;
resuming closure of the valve at the selected rate;
measuring and recording the time required to achieve a third steady-state flow rate downstream of the fluid pressure source and valve; and
calculating and storing valve position data based on values selected from the recorded flow rates, recorded valve positions, rate of valve closure, and recorded times.

11. The method of claim 10, wherein each flow rate is measured by measuring static pressure.

12. The method of claim 10, wherein one of the calculated and stored valve position data is an initial valve position that is calculated according to the formula:

$$Pidp - \left[Prr * \left(\frac{Lag1 + Lag2}{2}\right)\right]$$

where Pidp is the first valve position, Prr is the selected rate of valve closure, and Lag1 and Lag2 correspond respectively to the first and second times required to achieve the second and third steady-state flow rates.

13. The method of claim 10, wherein one of the calculated and stored valve position data is a mid-point valve position that is calculated according to the formula:

$$Pmdp - \left[Prr * \left(\frac{Lag1 + Lag2}{2}\right)\right]$$

where Pmdp is the second valve position, Prr is the selected rate of valve closure and Lag1 and Lag2 correspond respectively to the first and second times required to achieve the second and third steady-state flow rates.

14. The method of claim 10, wherein the valve is located in a fluid flow path of a blown-film extrusion apparatus.

15. The method of claim 10, wherein the valve manipulates an air flow rate in a blown-film extrusion line.

16. The method of claim 10, wherein each flow rate is measured by a mass air flow sensor.

17. The method of claim 10, wherein each flow rate is measured by measuring a pressure drop associated with the flow rate.

18. A method of calibrating a valve used between a blower and a blown-film die, the method comprising the steps of:
measuring and recording an idle static pressure downstream of the blower and valve with the blower in an idle state and the valve in an open position;
accelerating the blower to a selected speed;
measuring a steady-state, valve-open static pressure downstream of the blower and valve;
closing the valve at a selected rate of closure;
detecting a first static pressure change of a first predetermined amount of the valve-open static pressure downstream of the blower and valve as the valve closes and recording a first static pressure, valve position and time;
detecting a second static pressure change of a second predetermined amount of the valve-open static pressure downstream of the blower and valve as the valve closes and recording a second static pressure, valve position and time;
stopping closure of the valve;
measuring and recording the time required to achieve a second steady-state static pressure downstream of the blower and valve while the valve is stopped;
resuming closure of the valve at the selected rate;
measuring and recording the time required to achieve a third steady-state static pressure downstream of the blower and valve; and
calculating and storing valve position data based on values selected from the recorded static pressures, recorded valve positions, rate of valve closure, and recorded times.

19. The method of claim 18, wherein one of the calculated and stored valve position-data is an initial valve position that is calculated according to the formula:

$$Pidp - \left[Prr * \left(\frac{Lag1 + Lag2}{2}\right)\right]$$

where Pidp is the first valve position, Prr is the selected rate of valve closure and Lag1 and Lag2 correspond respectively to the recorded first and second times required to achieve the second and third steady-state static pressures.

20. The method of claim 18, wherein one of the calculated and stored valve position data is a mid-point valve position that is calculated according to the formula:

$$Pmdp - \left[Prr * \left(\frac{Lag1 + Lag2}{2}\right)\right]$$

where Pmdp is the second valve position, Prr is the selected rate of valve closure and Lag1 and Lag2 correspond respectively to the recorded first and second times required to achieve the second and third steady-state static pressures.

* * * * *